3,032,467
AMMONIUM SOAPS OF TUNG OIL FATTY ACIDS AS A FUGITIVE EMULSIFIER AND STICKING AGENT

Robert S. McKinney, Metairie, and Leo A. Goldblatt, New Orleans, La., assignors to the United States of America as represented by the Secretary of Agriculture
No Drawing. Filed Oct. 29, 1958, Ser. No. 770,564
2 Claims. (Cl. 167—42)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to spreadable compositions, particularly agricultural spray formulations, containing monoglycerides of tung oil or the ammonium soaps of tung oil fatty acids as fugitive emulsifiers and sticking agents.

In general this invention relates to such spreadable compositions containing long chain fatty acid monoglycerides prepared from tung oil, the principal fatty acid component of which is alpha-eleostearic acid. Alpha-eleostearic acid is present in tung oil to the extent of from about 70 to 80% by weight. Thus, crude monoglycerides prepared from tung oil contain a preponderance of monoglyceride represented by the formula:

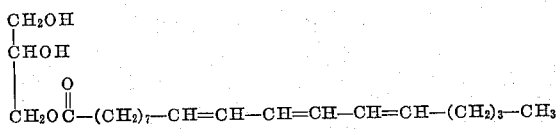

The unsaturated alkyl radical $C_{17}H_{29}$ contains three double bonds or points of unsaturation occurring in a "conjugated" or alternate system at the 9-11-13 carbon atoms. This type of unsaturation is commonly called "triene conjugation." The common chemical name for the aforementioned monoglyceride is glyceryl monoeleostearate. Similarly, the spreadable compositions may contain crude ammonium soaps prepared from tung oil fatty acids contain a preponderance of the soap of alpha-eleostearic acid represented by the formula:

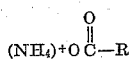

where R is the previously described unsaturated alkyl radical $C_{17}H_{29}$, and $(NH_4)^+$ indicates the positively charged ammonium ion or particle in the soap structure.

It is an objective of the present invention to prepare spreadable compositions containing tung oil products rich in both monoglycerides and triene conjugation, which products have particular utility as non-ionic (uncharged) fugitive emulsifiers and sticking agents. Another object of the invention is the preparation of improved emulsion formulations by incorporating ammonium soaps of tung oil fatty acids in the emulsions to act as ionic (charged) fugitive emulsifiers and sticking agents. Other objectives of the invention will be apparent to those skilled in the art as the description of the invention proceeds.

Considerable quantities of edible long chain fatty acid monoglycerides are conventionally used as emulsifiers in such food products as shortenings and the like. These edible monoglycerides are considerably different from tung oil monoglycerides which are inedible and contain large amounts of triene conjugation which are absent in the edible monoglycerides. We have found that tung oil monoglycerides are quite effective in lowering the surface tension of water and the interfacial tension of water with oils such as tung oil, cottonseed oil, linseed oil and the like. As little as 0.006% of crude tung oil monoglycerides (containing about 82% monoglycerides) lowered the surface tension of water from 70.4 to 34.7 dynes per cm., and 0.1% of these crude tung oil monoglycerides lowered the interfacial tension of cottonseed oil from 20.8 to 4.8 dynes per cm. These valuable properties in conjunction with the unique chemical structure of the tung oil monoglycerides makes them useful in inedible products as fugitive emulsifiers, that is, emulsifiers which exhibit a temporary emulsifying action. In addition, the uniquely high triene conjugated structure of the tung oil monoglycerides gives them a second valuable property, namely a residual adhesiveness or property as a sticking agent, after the monoglycerides have served their initial function of emulsification. The combined properties of temporary emulsification and sticking agent make tung oil monoglycerides valuable for use in agricultural sprays containing an active ingredient to be spread and any other spreadable composition, containing a material to be spread, which can be painted, poured, or otherwise coated on the surface to be treated. Fugitive emulsifiers have many practical applications, for example in water dispersible paints. For example, we have found that when small amounts of either tung oil monoglycerides or the ammonium soaps of tung oil fatty acids are incorporated in aqueous agricultural sprays where an emulsifier is essential for the purpose of dispersing the active ingredients (generally water-insoluble) in water, they not only serve as the essential emulsifiers but the partially dried film of the fatty material resulting from chemical reaction (polymerization) of the triene conjugated structure serves to bind the active spray ingredients to the sprayed surfaces thus providing a more durable spraying treatment. When we say active ingredient, we mean any toxic chemical composition normally applied in agricultural sprays for the destruction or control of insect pests and the like. The ammonium ion is preferred in the soaps of the tung oil fatty acids since it is ultimately released as volatile ammonia gas upon decomposition of the soap, thus leaving an essentially water-insoluble film of the partially dried, polymerized fatty acids.

Tung oil monoglycerides may be prepared by the conventional glycerolysis (that is, reaction with glycerol) of the fatty acid glycerides, in this case tung oil, using sodium hydroxide as a catalyst. The glycerolysis may also be carried out using anhydrous reactants and sodium methoxide as catalyst, in which case it is advantageous to employ 30% by weight of glycerol based on the weight of tung oil and about 1% sodium methoxide based on the weight of tung oil. We have found, however, that products richest in both monoglycerides and triene conjugation are obtained by glycerolysis of tung oil with sodium methoxide in pyridine solution, using a procedure which is an adaptation from the method of Mattil and Sims [Journal of the American Oil Chemists' Society, 29, 59–61 (1952)]. In this preferred procedure, dry tung oil and anhydrous glycerol are heated with 5 parts of pyridine for 5 minutes at 80° C., using 2% of sodium methoxide based on the weight of tung oil. The resulting solution is treated with excess dilute mineral acid and the crude monoglycerides are then washed with hot salt water and dried. The crude tung oil monoglycerides prepared in this manner usually contains about 80% monoglycerides and about 63% triene conjugation, as eleostearic acid. The crude monoglyceride preparations are especially suitable for use in the improved spray formulations which are a subject of the present invention.

The following examples are given by way of illustration and not by way of limitation of this invention. All parts and percentages are by weight.

Example 1

A mixture of 1 part of dry tung oil, 1 part of anhydrous glycerol, 5 parts of pyridine, and 0.02 part of sodium methoxide was kept at 80° C. for 5 minutes. The resulting solution was treated with an excess of dilute aqueous hydrochloric acid to neutralize the sodium methoxide catalyst. Two layers separated. The upper layer which contained the crude tung oil monoglycerides was washed with a hot aqueous solution of sodium chloride and then dried in vacuo at a temperature not exceeding 60° C. The dried product contained 78.2% monoglycerides, 7.57% hydroxyl, and 63.0% triene conjugation, as eleostearic acid.

A suspension was prepared by mixing 0.1 part (0.2%) of the crude tung oil monoglycerides and 1 part of lead arsenate with 50 parts of distilled water, and making slightly alkaline to phenolphthalein indicator. Filter paper (24 cm. diameter) was suspended in an air conditioned room until it attained constant weight and was then sprayed with 10 ml. of the lead arsenate suspension from a spray gun, the suspension being continuously agitated during the spraying operation. The sprayed paper was allowed to dry to constant weight (overnight). It was then washed by spraying with 100 ml. of distilled water and again allowed to dry to constant weight in the air conditioned room. The differences in weights before and after spraying with insecticide (lead arsenate) and after washing with water indicated the amount and proportion of lead arsenate retained on the paper. A second indication of the amount retained was obtained by analytically determining the amount of lead on the papers before and after washings. In this experiment, the water spray washed away only 12% of the dried residue. A total of 67.2 milligrams of lead was found on the paper after washing with the water spray.

An identical experiment was carried out, except that an equal amount of cottonseed oil monoglycerides was substituted for the tung oil monoglycerides in the spray formulation. In this case, the water spray washed away 33% of the dried residue. A total of only 34.6 milligrams of lead was found on the paper after washing with the water spray.

*Example 2*

The spraying procedure of Example 1 was repeated except that 0.04% of the crude tung oil monoglycerides was used in the spray formulation. In this experiment, the water spray washed away 35% of the dried residue. A total of 32.2 milligrams of lead was found on the paper after washing with the water spray.

An identical experiment was carried out, except that an equal amount of a commercial spreader-adhesive was substituted for the tung oil monoglycerides in the spray formulation. In this case, the water spray washed away 41% of the dried residue. A total of 28.7 milligrams of lead was found on the paper after washing with the water spray.

*Example 3*

A slightly warm alcoholic solution of tung oil fatty acids was treated with an excess of a concentrated aqueous solution of ammonia, and then cooled. The ammonium soap which formed was separated and dried under vacuum at a temperature below 60° C.

The spraying procedure of Example 1 was repeated using 2% of this ammonium soap of tung oil fatty acids in the spray formulation. In this experiment, the water spray washed away only 1% of the dried residue. A total of 83.1 milligrams of lead was found on the paper after washing with the water spray.

An identical experiment was carried out, except that an equal amount of a commercial fish oil soap was substituted for the ammonium soap of tung oil fatty acids in the spray formulation. In this case, the water spray washed away 25% of the dried residue. A total of 54.6 milligrams of lead was found on the paper after washing with the water spray.

We claim:
1. A spreadable composition comprising an aqueous emulsion of a material to be spread and the ammonium soaps of tung oil fatty acids as a fugitive emulsifier and sticking agent therefor.
2. An insecticidal spray formulation comprising an aqueous emulsion of an active ingredient to be spread and the ammonium soaps of tung oil fatty acids as a fugitive emulsifier and sticking agent therefor.

References Cited in the file of this patent

UNITED STATES PATENTS

| | | |
|---|---|---|
| 2,104,491 | McKinney | Jan. 4, 1938 |
| 2,789,119 | Sully | Apr. 16, 1957 |
| 2,907,691 | Hartley et al. | Oct. 6, 1959 |
| 2,909,540 | Woods | Oct. 20, 1959 |

OTHER REFERENCES

Mattil: Journal of American Oil Chemists' Society, vol. 29, pp. 59–61 (1952).

Planck: Journal of the American Oil Chemists' Society, vol. 30, pp. 387–391, December 1953.

Department of Agriculture, New Tung Oil Derivatives, Ars–72–7, pp. 1–6, December 1956.

Bradley: Industrial and Eng. Chem., vol. 29, No. 5, pp. 579–583 (May 1937).

McCutcheon: Synthetic Detergents up to Date, II, Soap and Sanitary Chemicals, 28:10, October 52, p. 57.